United States Patent
Jung

(10) Patent No.: US 7,943,937 B2
(45) Date of Patent: May 17, 2011

(54) ARRAY SUBSTRATE FOR LIQUID CRYSTAL DISPLAY DEVICE AND METHOD OF FABRICATING THE SAME

(75) Inventor: Jin-Hyung Jung, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/450,345

(22) Filed: Jun. 12, 2006

(65) Prior Publication Data

US 2007/0090421 A1    Apr. 26, 2007

(30) Foreign Application Priority Data

Oct. 20, 2005    (KR) .................. 10-2005-0098889

(51) Int. Cl.
*H01L 27/14* (2006.01)
*H01L 31/036* (2006.01)

(52) U.S. Cl. .............. 257/72; 257/59; 257/E27.122; 257/E31.04

(58) Field of Classification Search .......... 257/72, 257/59, E27.122, E31.04
See application file for complete search history.

(56) References Cited

U.S. PATENT DOCUMENTS

| 7,265,799 B2 * | 9/2007 | Souk et al. ............... 349/43 |
| 2004/0125248 A1 | 7/2004 | Song |
| 2005/0104069 A1 * | 5/2005 | Jun et al. ............... 257/72 |
| 2006/0091396 A1 * | 5/2006 | Lee et al. ............... 257/72 |
| 2006/0132411 A1 * | 6/2006 | Kim et al. ............... 345/92 |
| 2006/0138428 A1 * | 6/2006 | Ahn et al. ............... 257/72 |

FOREIGN PATENT DOCUMENTS

| JP | 08334782 A | 12/1996 |
| JP | 10-48664 | 2/1998 |
| JP | 2004-262699 | 9/2004 |
| JP | 2005316356 A * | 11/2005 |

OTHER PUBLICATIONS

Machine translation of JP 2005-316356.*

* cited by examiner

*Primary Examiner* — Anh Phung
*Assistant Examiner* — Allison P Bernstein
(74) *Attorney, Agent, or Firm* — McKenna Long & Aldridge, LLP.

(57) ABSTRACT

An array substrate for a liquid crystal display device includes: a gate line and a first storage electrode on a substrate; a gate insulating layer on the gate line and the first storage electrode; a data line over the gate insulating layer, the data line crossing the gate line to define a pixel region; a passivation layer on the data line, wherein a first thickness of the passivation layer and the gate insulating layer over the first storage electrode is thinner than a second thickness of the passivation layer and the gate insulating layer over the gate line; and a pixel electrode and a second storage electrode on the passivation layer, the second storage electrode extended from the pixel electrode and overlapped with the first storage electrode.

9 Claims, 10 Drawing Sheets

ARRAY SUBSTRATE FOR LIQUID CRYSTAL DISPLAY DEVICE AND METHOD OF FABRICATING THE SAME

The present invention claims the benefit of Korean Patent Application No. 10-2005-0098889, filed in Korea on Oct. 20, 2005, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate for an LCD device and a method of fabricating the same.

2. Discussion of the Related Art

Generally, an LCD device uses the optical anisotropy and the polarization properties of liquid crystal molecules to display images. Liquid crystal molecules have a defined orientation and alignment order resulting from their thin and long shapes. The alignment direction of the liquid crystal molecules may be controlled by applying an electric field to the liquid crystal molecules. As the intensity of the electric field is changed, the alignment of the liquid crystal molecules also changes. Because incident light through liquid crystal is refracted based on an orientation of the liquid crystal molecules, due to the optical anisotropy of the aligned liquid crystal molecules, intensity of the incident light may be controlled and images may be displayed.

Active matrix LCD (AM-LCD) devices are commonly used LCD devices. AM-LCD devices have thin film transistors (TFTs) disposed in a matrix and pixel electrodes connected to the TFTs. AM-LCD devices have been developed because of their high resolution and superiority in displaying moving images.

FIG. 1 is a schematic perspective view of a liquid crystal display device according to the related art. In FIG. 1, an LCD device includes a first substrate 81, a second substrate 11 facing the first substrate 81 and a liquid crystal layer 70 interposed therebetween.

A color filter layer 89 including red, green and blue sub-color filters 89a, 89b and 89c is formed on an inner surface of the first substrate 81, a black matrix 85 is formed between adjacent red, green and blue sub-color filters 89a, 89b and 89c, and a transparent common electrode 92 on the color filter layer 89 and the black matrix 85.

A pixel electrode 65, a switching element "Tr" and array lines are formed on the second substrate 11. The switching element "Tr," for example, is a thin film transistor (TFT) disposed in a matrix arrangement and connected to a gate line 15 and a data line 40 that cross each other. A pixel region P is defined at a crossing portion of the gate line 15 and the data line 40. The pixel electrode 65 may be made of a transparent conductive material disposed in the pixel region "P."

Substantially, the black matrix 85 may correspond to a non-pixel region (not show).

A voltage may be applied to the liquid crystal layer 70 to impart an electro-optical effect to the liquid crystal layer 70. This electro-optical effect drives the LCD device. Because the liquid crystal layer 70 is made of a material having dielectric anisotropy and spontaneous polarization, a dipole is formed in the liquid crystal layer 70 due to the spontaneous polarization that occurs when a voltage is applied. Thus, an alignment direction of liquid crystal molecules is changed according to a direction of an electric field resulting from the applied voltage. Optical properties of the LCD device depend on the alignment order of liquid crystal molecules. The alignment order causes an electrical light modulation. The LCD device displays images by shielding or transmitting light using the electrical light modulation.

First and second polarizers (not shown) transmit light parallel to polarizer axes and may be disposed on outer sides of the first and second substrates 81 and 11, respectively. A backlight unit (not shown) is used as a light source and may be disposed under one of the polarizers.

FIG. 2 is a schematic plan view showing an array substrate for an LCD device according to the related art. FIG. 3 is a schematic cross-sectional view taken along a line III-III of FIG. 2.

In FIGS. 2 and 3, a gate line 15 and a data line 40 cross each other to define a pixel region "P" and a switching element TFT "Tr" is disposed at a crossing of the gate line 15 and the data line 40. A scan signal and an image signal are supplied to the gate line 15 and the data line 40, respectively, from an external circuit (not shown). The TFT "Tr" is connected to the gate line 15, the data line 40, and a pixel electrode 65 in the pixel region "P."

The TFT "Tr" includes a gate electrode 18, a semiconductor layer 35, and source and drain electrodes 43 and 46. The semiconductor layer 35 includes an active layer 35a and an ohmic contact layer 35b. The gate electrode 18 is connected to the gate line 15. The source and drain electrodes 43 and 46 are formed to overlap the gate electrode 18 and are spaced apart from each other. Part of the semiconductor layer 35 occupies a space between the source and drain electrodes 43 and 46. The source electrode 43 is connected to the data line 40 and the drain electrode 46 is connected to the pixel electrode 65.

The gate line 15 may be classified as a (n–1)th gate line. Thus, a nth gate line is adjacent the (n–1)th gate line. The (n–1)th gate line has a width W1. A nth storage capacitor "Cst" (nth Cst) includes a first storage electrode 20 occupying a portion of the (n–1)th gate line 15 and a second storage electrode 66 extended from the pixel electrode 65 to overlap with the first storage electrode 20.

The cross-sectional structure of the array substrate of the related art will be explained. The gate electrode 18, the gate line 15, and the first storage electrode 20 extended from the gate line 15 are formed on the substrate 11. A gate insulating layer 30 is formed on the gate electrode 18, the gate line 15 and the first storage electrode 20.

The TFT "Tr" is formed on the gate insulating layer 30 to be disposed over the gate electrode 18. A passivation layer 55 is formed on the TFT "Tr" and has a drain contact hole 60 that exposes a portion of the drain electrode 46.

A pixel electrode 65 and the second storage electrode 66 extended from the pixel electrode 65 are formed on the passivation layer 55. The pixel electrode 55 may be connected to the drain electrode 46 via the drain contact hole 60. In addition, the second storage electrode 66 is disposed over the first storage electrode 20. The first storage electrode 20 and the second storage electrode 66, with the gate insulating layer 30 and the passivation layer 55 therebetween, are a dielectric configuration that constitutes a storage capacitor "Cst."

The storage capacitor "Cst" provides a predetermined voltage to the pixel electrode 65 for a predetermined period of time. Accordingly, to maintain the predetermined voltage at the pixel electrode 65 for the predetermined period of time, the storage capacitor "Cst" must have a capacitance "C" that corresponds to the predetermined voltage.

The capacitance "C" of the storage capacitor "Cst" may be depicted as follows:

$$C = \epsilon \times A/d \qquad (1)$$

In equation ① above, "C" is capacitance, "∈" is a dielectric constant between first and second storage electrodes, "A" is a size of the first and second electrodes, and "d" is a distance between the first and second electrodes.

According to equation ① above, the capacitance "C" is directly proportional to the size "A" of the first and second storage electrodes and the dielectric constant "∈" between the first and second storage electrodes. The capacitance "C" is also inversely proportional to the distance "d" between the first and second storage electrodes. Thus, the storage capacitor "Cst" may obtain a greater capacitance "C" as the size "A" of the first and second storage electrodes and the dielectric constant "∈" between the first and second storage electrodes increase and the distance "d" between the first and second storage electrodes decrease.

Consequently, because the storage capacitor "Cst" may have a greater capacitor "C" as the size "A" of the storage electrode increases, the gate line 15 having the first storage electrode 20 should have an appropriate width to accommodate the capacitance "C" of the storage capacitor "Cst."

However, when the width "W1" of the gate line 15 is increased for accommodating an increased capacitance "C," an aperture ratio of the LCD device is reduced. Thus, the brightness of the LCD device is also reduced.

SUMMARY OF THE INVENTION

Accordingly, the present invention is directed to an array substrate for a liquid crystal display (LCD) device and a method of fabricating the same that substantially obviate one or more of the problems due to limitations and disadvantages of the related art.

An advantage of the present invention is to provide an array substrate for an LCD device that includes a storage capacitor having an increased capacitance without increasing a size of the storage capacitor.

Another advantage of the present invention is to provide an array substrate for an LCD device that includes a storage capacitor having an increased capacitance and an improved aperture ratio.

Another advantage of the present invention is to provide a method of fabricating an array substrate for an LCD device that includes forming a storage capacitor having an increased capacitance without increasing a size of first and second storage electrodes.

Another advantage of the present invention is to provide a method of fabricating an array substrate for an LCD device that includes forming a storage capacitor having an increased capacitance and an improved aperture ratio.

Another advantage of the present invention is to provide an array substrate for an LCD device, and a method of fabricating the same, that obtains a high brightness.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, an array substrate for a liquid crystal display device includes: a gate line and a first storage electrode on a substrate; a gate insulating layer on the gate line and the first storage electrode; a data line over the gate insulating layer, the data line crossing the gate line to define a pixel region; a passivation layer on the data line, wherein a first thickness of the passivation layer and the gate insulating layer over the first storage electrode is thinner than a second thickness of the passivation layer and the gate insulating layer over the gate line; and a pixel electrode and a second storage electrode on the passivation layer, the second storage electrode extended from the pixel electrode and overlapped with the first storage electrode.

In another aspect of the present invention, an array substrate for a liquid crystal display device includes: a gate line on a substrate; a data line crossing the gate line; a thin film transistor connected to the gate line and the data line; a pixel electrode connected to the thin film transistor, the pixel electrode overlapping the gate line in an overlapped region; and an insulating layer between the gate line and the pixel electrode, wherein a first thickness of the insulating layer corresponding to the overlapped region is thinner than a second thickness of the insulating layer corresponding to regions other than the overlapped region.

In another aspect of the present invention, a method of fabricating an array substrate for a liquid crystal display device includes: forming a gate line and a first storage electrode on a substrate; forming a gate insulating layer on the gate line and the first storage electrode; forming a data line over the gate insulating layer, the data line crossing the gate line to define a pixel region; forming a thin film transistor connected to the gate line and the data line; forming a passivation layer on the thin film transistor, wherein a first thickness of the passivation layer and the gate insulating layer over the first storage electrode is thinner than a second thickness of the passivation layer and the gate insulating layer over the gate line; and forming a pixel electrode and a second storage electrode on the passivation layer, the second storage electrode extended from the pixel electrode and overlapped with the first storage electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF ILLUSTRATED EMBODIMENTS

Reference will now be made in detail to an embodiment of the present invention, example of which is illustrated in the accompanying drawings.

Figure 4:
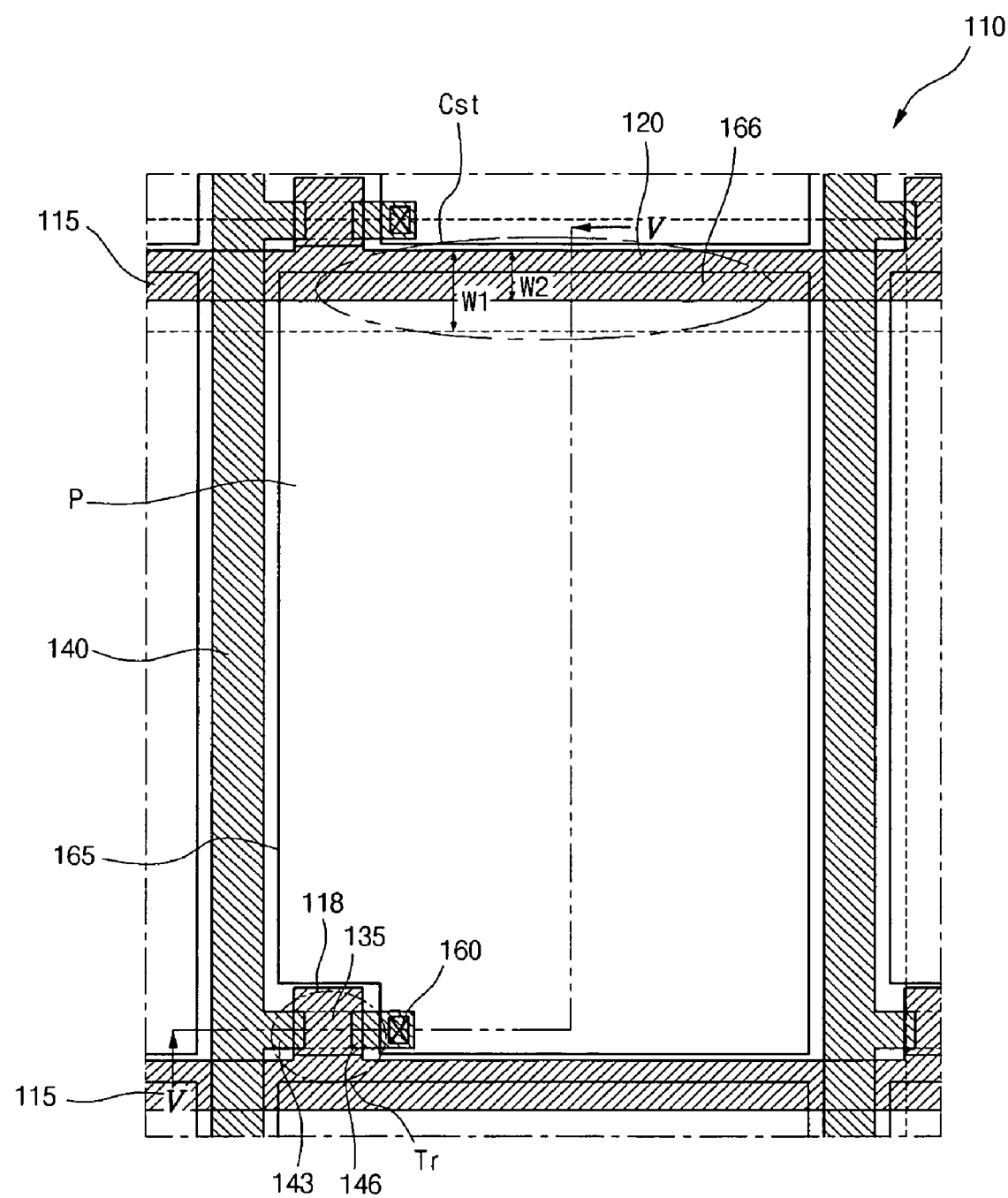
FIG. 4 is a schematic plan view showing an array substrate for an LCD device according to an embodiment of the present invention.
Figure 5A:
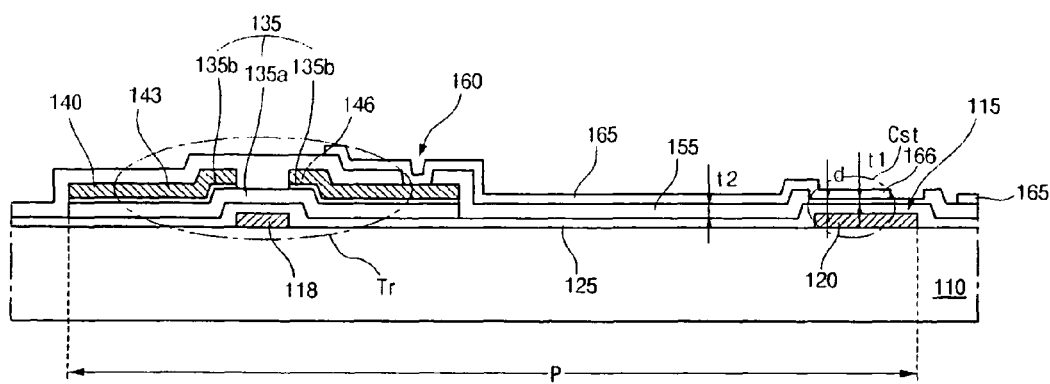
FIGS. 5a and 5b are schematic cross-sectional views taken along a line V-V of FIG. 4.
Figure 5B:
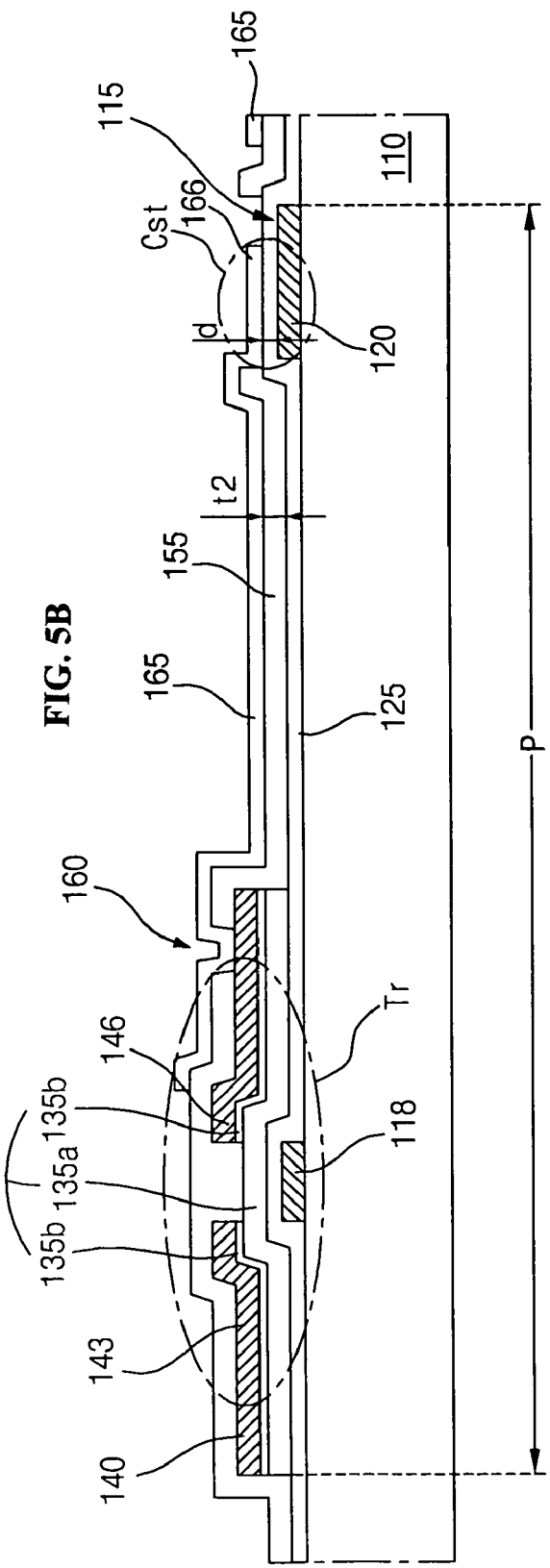

FIG. 4 is a schematic plan view showing an array substrate for an LCD device according to an embodiment of the present invention. FIGS. 5a and 5b are schematic cross-sectional views taken along a line V-V of FIG. 4.

In FIGS. 4, 5a and 5b, a gate line 115 is formed along a first direction and a data line 140 is formed along a second direction crossing the first direction to define a pixel region "P." A thin film transistor "Tr" is formed at the crossing of the gate and data lines 115 and 140. A pixel electrode 165 is formed in the pixel region "P" and is connected to the thin film transistor "Tr."

Further, a first storage electrode 120 occupies a portion of the gate line 115. A second storage electrode 166 extends from the pixel electrode 165 to overlap with the first storage electrode 120.

The cross-sectional structure of the array substrate will be explained. A gate electrode 118 and the first storage electrode 120 are formed on a substrate 110 and a gate insulating layer 125 is formed on the gate electrode 118 and the first storage electrode 120. A semiconductor layer 135, which includes an active layer 135a and an ohmic contact layer 135b on the active layer 135a, is formed on the gate insulating layer 125 over the gate electrode 118. A source electrode 143 and a drain electrode 146 spaced apart from the source electrode 143 are formed on the semiconductor layer 135. Part of the semiconductor layer 135 occupies a space between the source and drain electrodes 143 and 146. The gate electrode 118, the semiconductor layer 135, the source electrode 143 and the drain electrode 146 constitute a thin film transistor "Tr" that is used as a switching element. A passivation layer 155 is formed on the thin film transistor "Tr" and the gate insulating layer 125 over the first storage electrode 120. The passivation layer 155 has a drain contact hole 160 that exposes a portion of the drain electrode 146. A pixel electrode 165 and a second storage electrode 166 extended from the pixel electrode 165 are formed on the passivation layer 155. The pixel electrode 165 may be connected to the drain electrode 146 via the drain contact hole 160.

The first storage electrode 120 and the second storage electrode 166, including the gate insulating layer 125 and the passivation layer 155 therebetween, are a dielectric configuration that constitutes a storage capacitor "Cst."

It is noted that a first thickness "t1" of the passivation layer 155 corresponding to the storage capacitor "Cst" is thinner than a second thickness "t2" of the passivation layer 155 corresponding to the thin film transistor "Tr" and other portions not corresponding to the storage capacitor "Cst."

The capacitance "C" of the storage capacitor "Cst" may be depicted as follows:

$$C = \in \times A/d \quad (1)$$

In equation (1) above, "C" is capacitance, "∈" is a dielectric constant between first and second storage electrodes, "A" is a size of the first and second electrodes, and "d" is a distance between the first and second electrodes.

Figure 1:
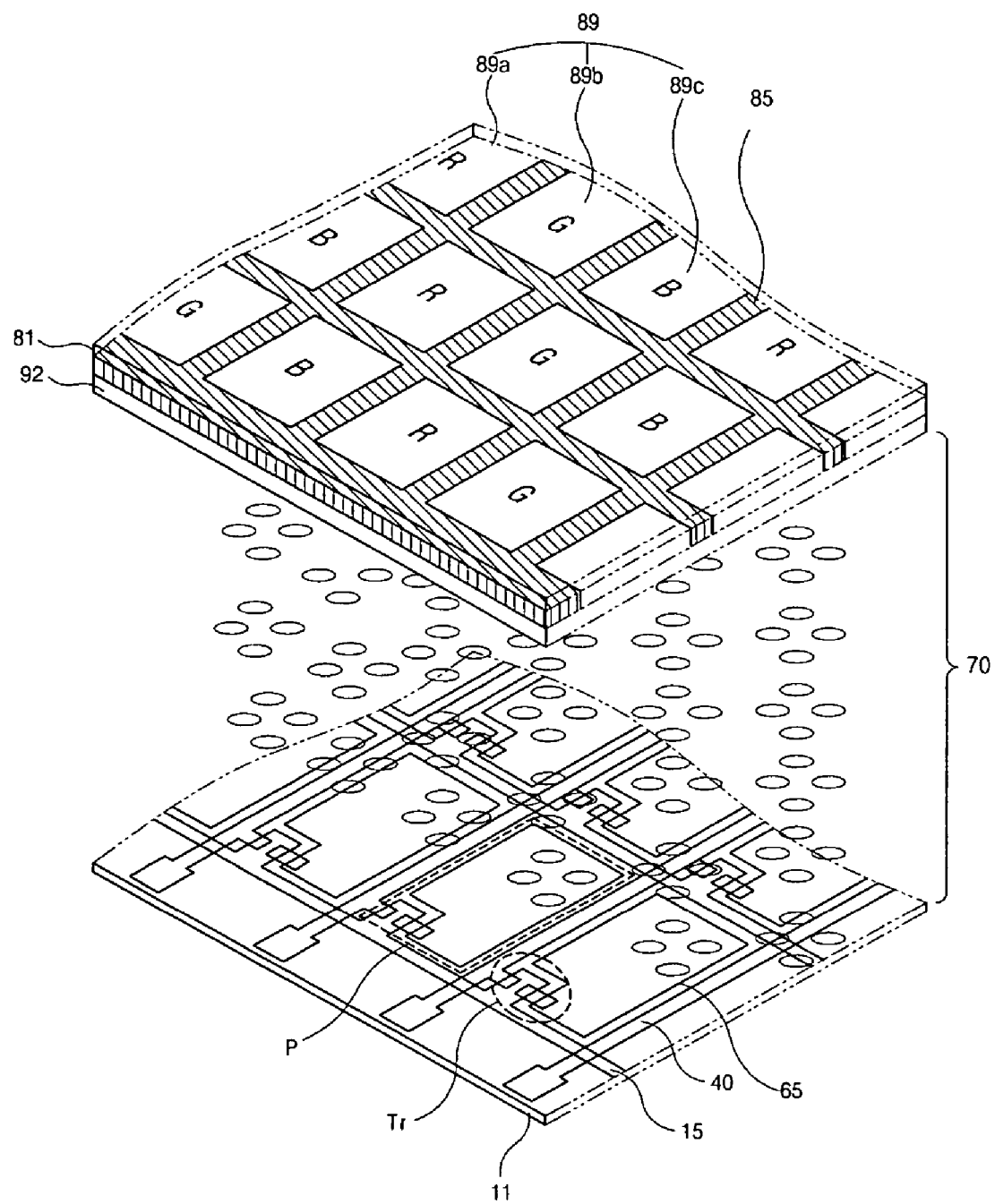
FIG. 1 is a schematic perspective view of a liquid crystal display device according to the related art.
Figure 2:
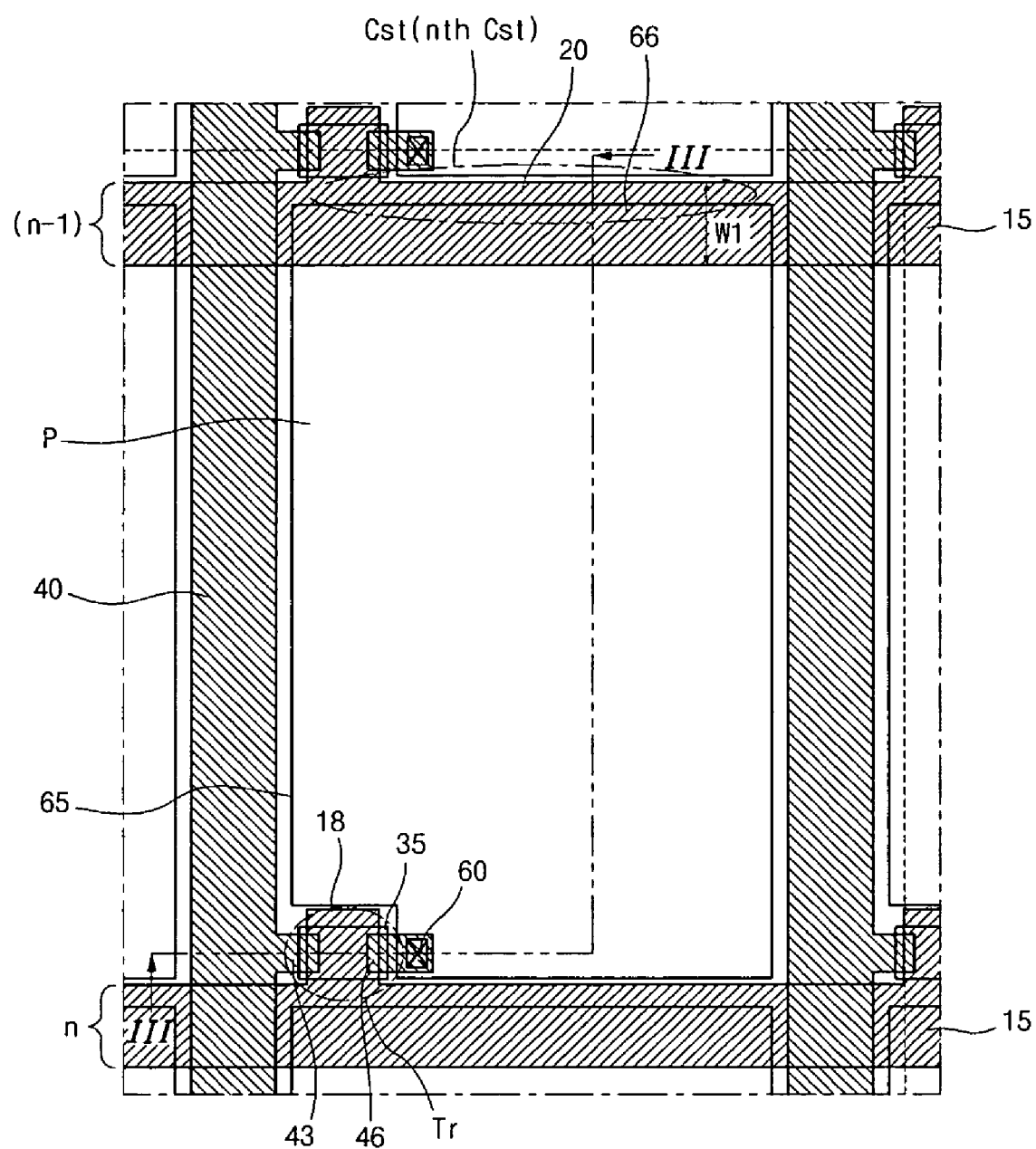
FIG. 2 is a schematic plan view showing an array substrate for an LCD device according to the related art.
Figure 3:
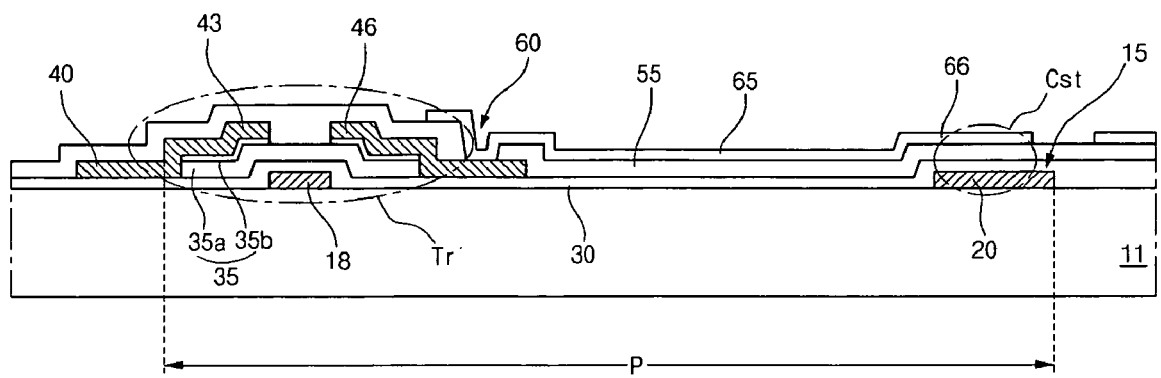
FIG. 3 is a schematic cross-sectional view taken along a line III-III of FIG. 2.

That is, a capacitance "C" of the storage capacitor "Cst" is inversely proportional to a distance "d" between the first and second storage electrodes 120 and 166. Accordingly, although the gate line 115 has a smaller width "W2" than the width "W1" of gate line 15 of FIG. 2, the capacitance "C" of the storage capacitance "Cst" is not reduced. Consequently, an aperture ratio of the LCD device is improved without reducing the capacitance "C" of the storage capacitor "Cst."

In order to reduce the distance "d" between the first and second storage electrodes 120 and 166, the passivation layer 155 may have an open portion that exposes a portion of the gate insulating layer 125 that corresponds to the storage capacitor "Cst." of FIG. 5b.

For example, the array substrate may be formed by four mask processes such that the semiconductor layer and the data line are formed by one mask process. Therefore, the semiconductor layer and data patterns (the data line, the source electrode and the drain electrode) may have shapes corresponding to each other.

FIGS. 6A to 6H are schematic cross-sectional views taken along a line V-V of FIG. 4 and illustrate a method of fabricating an array substrate for an LCD device according to an embodiment of the present invention.

Figure 6A:
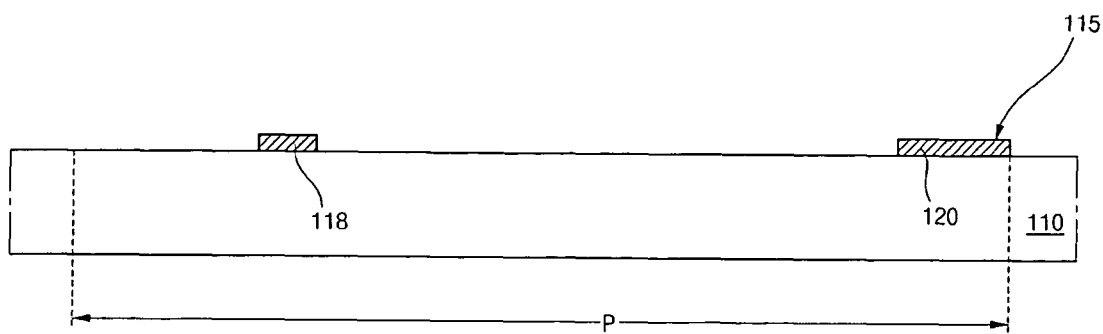
FIGS. 6A, 6B, 6C, 6D, 6E, 6F, 6G and 6H are schematic cross-sectional views taken along a line V-V of FIG. 4 and illustrate a method of fabricating an array substrate for an LCD device according to an embodiment of the present invention.

In FIG. 6A, the gate electrode 118, the gate line 115, and the first storage electrode 120 extended from the gate line 115 are formed by depositing a first metallic material layer on the substrate 110 through a photolithography process. The first storage electrode 120 occupies a portion of the gate line 115.

Although not shown, the photolithography process includes coating a photoresist layer and exposing and developing the photoresist layer to form a photoresist pattern that is used as a mask to etch the metallic material layer. After etching the metallic material layer, the photoresist pattern is removed.

A gate pad (not shown) extends from an end portion of the gate line 115.

Figure 6B:
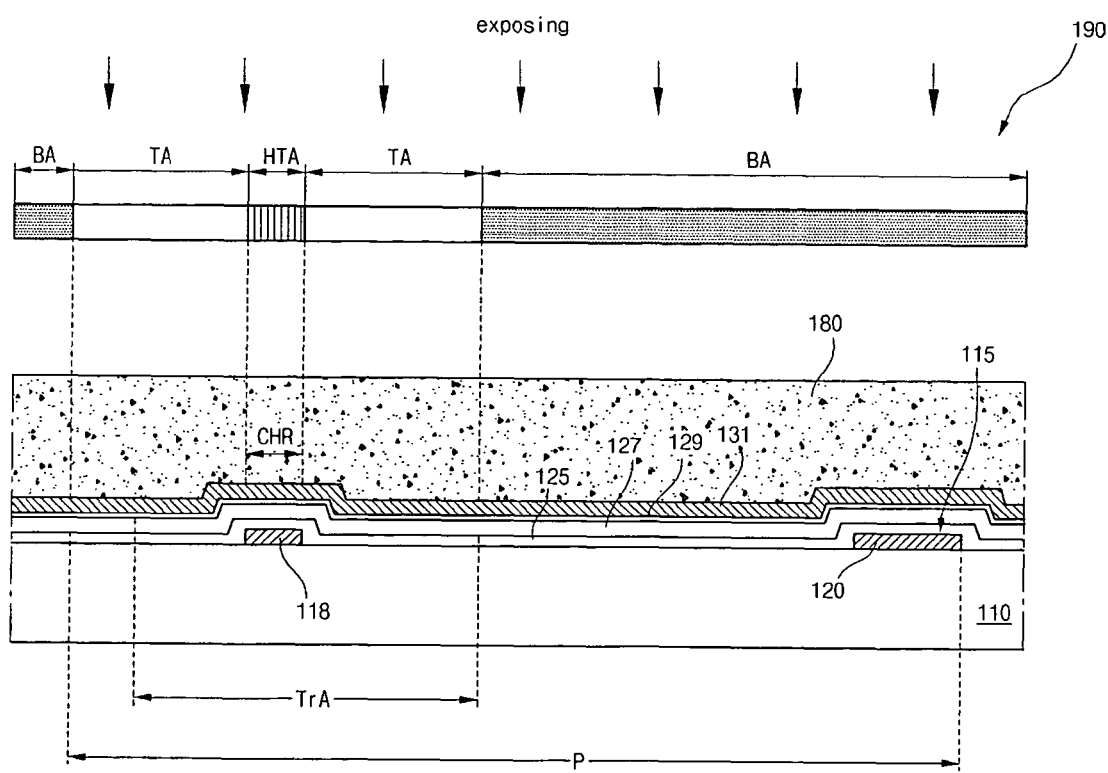

In FIG. 6B, a gate insulating layer 125, an intrinsic amorphous silicon layer 127, a doped amorphous silicon layer 129, and a second metallic material layer 131 are sequentially formed on an entire surface of the substrate 110 including the gate electrode 118, the gate line 115 and the first storage electrode 120. The gate insulating layer 125 may include an inorganic insulating material such as silicon oxide (SiOx) or silicon nitride (SiNx).

Next, a photoresist layer 180 is coated on the second metallic material layer 131. A first mask 190 having a transmissive area "TA," a blocking area "BA" and a partially transmissive area is disposed over the photoresist layer 180. The partially transmissive area may be a half-transmissive area "HTA."

The photoresist layer 180 may include a negative type or a positive type photoresist material. The transmissive area "TA" of the first mask 190 is disposed to correspond to a thin film transistor formation region "TrA" and the half-transmissive area "HTA" is disposed to correspond to a channel formation region "CHR" over the gate electrode 118.

Figure 6C:
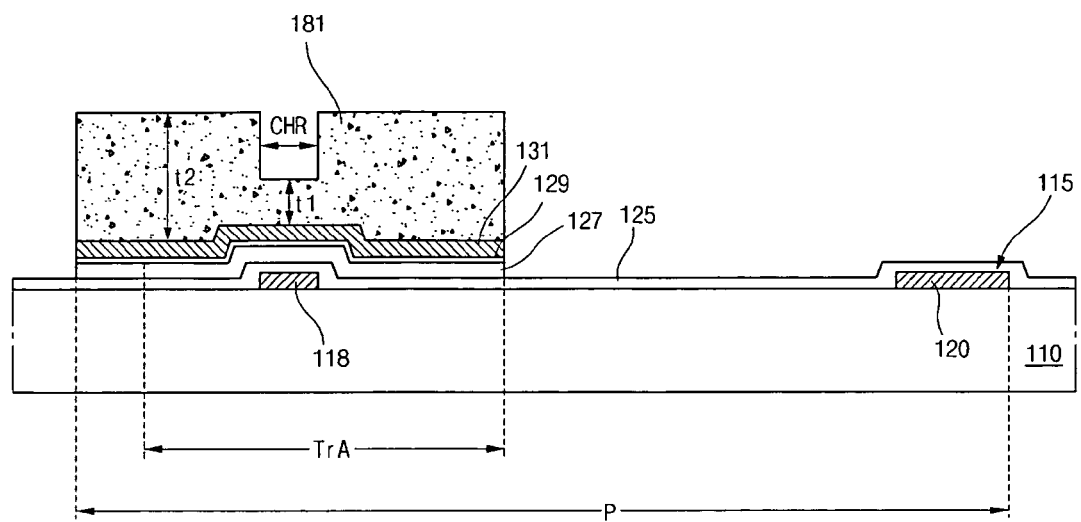

In FIG. 6C, a first photoresist pattern 181 is formed by etching and developing the photoresist layer 180 using the first mask 190. Next, portions of the gate insulating layer 125, the intrinsic amorphous silicon layer 127, the doped amorphous silicon layer 129 and the second metallic material layer 131 exposed by the first photoresist pattern 181 are etched.

In this step, a portion of the photoresist layer 180 corresponding to the blocking area "BA" is removed to expose the second metallic material layer 131 therebelow. A portion corresponding to the half-transmissive area "HTA" is partially etched. Therefore, a first thickness "t1" of the first photoresist pattern 181 in the channel formation region "CHR" is thinner than a second thickness "t2" of the first photoresist pattern 181 exposed through the transmissive region "TR."

Figure 6D:
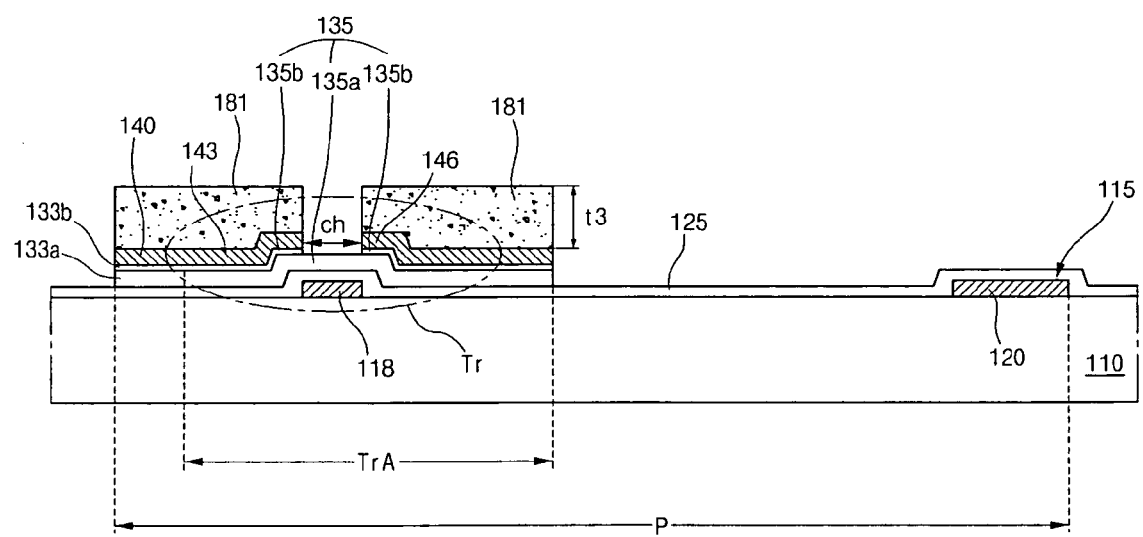

In FIG. 6D, the first photoresist pattern 181 is etched by the first thickness "t1" to expose the second metallic material layer 131 in the channel formation region "CHR," and then the first photoresist pattern has a third thickness "t3." The first photoresist pattern 181 may be etched by an anisotropic dry-etching process.

Then, the exposed second metallic material layer 131 and the exposed doped amorphous silicon layer 129 are sequentially etched to expose a portion of the intrinsic amorphous silicon layer 127 in the channel formation region "CHR." The exposed portion of the intrinsic amorphous silicon layer 127 may define a channel region "ch."

In this step, the intrinsic amorphous silicon layer 127, the doped amorphous silicon layer 129 and the second metallic material layer 131 are patterned into an active layer 135a, an ohmic contact layer 135b, a source electrode 143 and a drain electrode 146, respectively. The active layer 135a and the ohmic contact layer 135b constitute a semiconductor layer 135. The first photoresist pattern 181 is then removed from the substrate 110.

Further, because the semiconductor layer 135 is formed by the same process as data patterns, i.e., the data line 140, the source electrode 143 and the drain electrode 140, first and second semiconductor layers 133a and 133b sequentially extend from the active layer 135a and the ohmic contact layer 135b, respectively. The first and second semiconductor layers 133a and 133b have shapes corresponding to the data line 140.

A data pad (not shown) extends from an end portion of the data line 140.

The gate electrode 118, the semiconductor layer 135, the source electrode 143 and the drain electrode 146 constitute a thin film transistor "Tr."

Figure 6E:
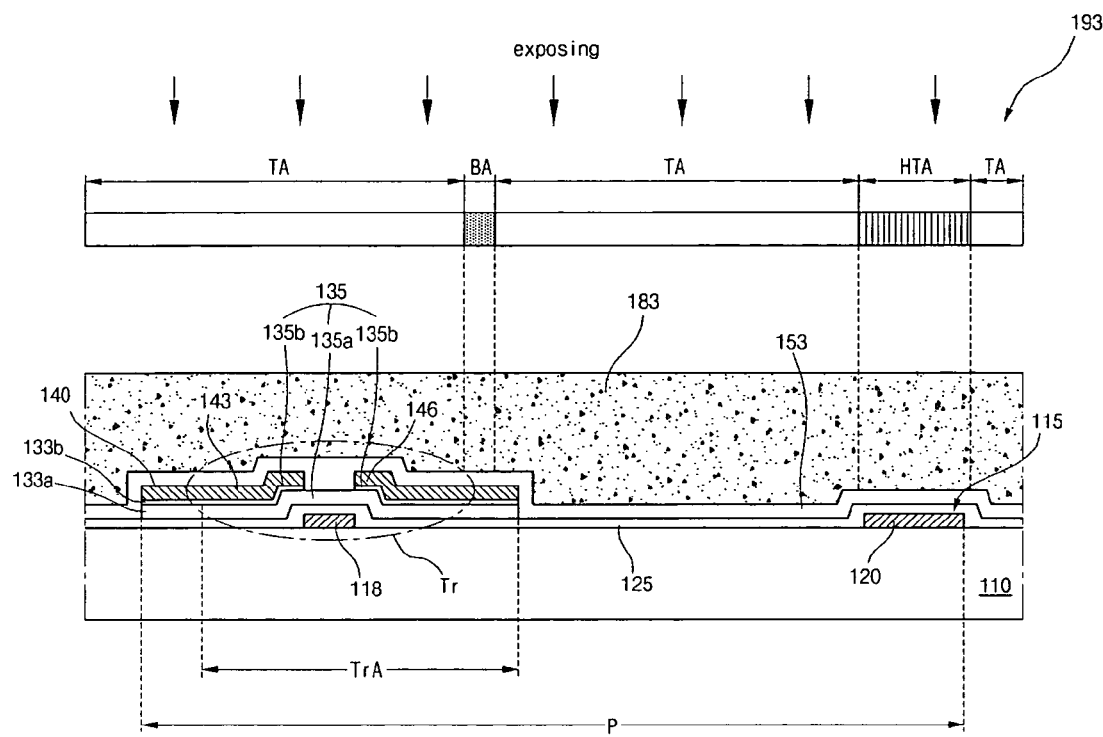

In FIG. 6E, an insulating layer 153 and a photoresist layer 183 are sequentially formed on an entire surface of the substrate 110 including the thin film transistor "Tr."

The insulating layer 153 may be formed by depositing an organic insulating material or by coating an inorganic insulating material with a uniform thickness on the whole surface of the substrate 110. The inorganic insulating material may include silicon oxide (SiOx) or silicon nitride (SiNx).

Then, a second mask 193, which includes a transmissive area "TA," a blocking area "BA" and a partially transmissive area is disposed over the photoresist layer 183. The partially transmissive area may be a half-transmissive area HTA. The photoresist layer 183 may include a negative type or a positive type photoresist material. The blocking area "BA" of second mask 193 is disposed over a portion of the drain electrode 146 and the half-transmissive area "HTA" is disposed over the first storage electrode 120.

Figure 6F:
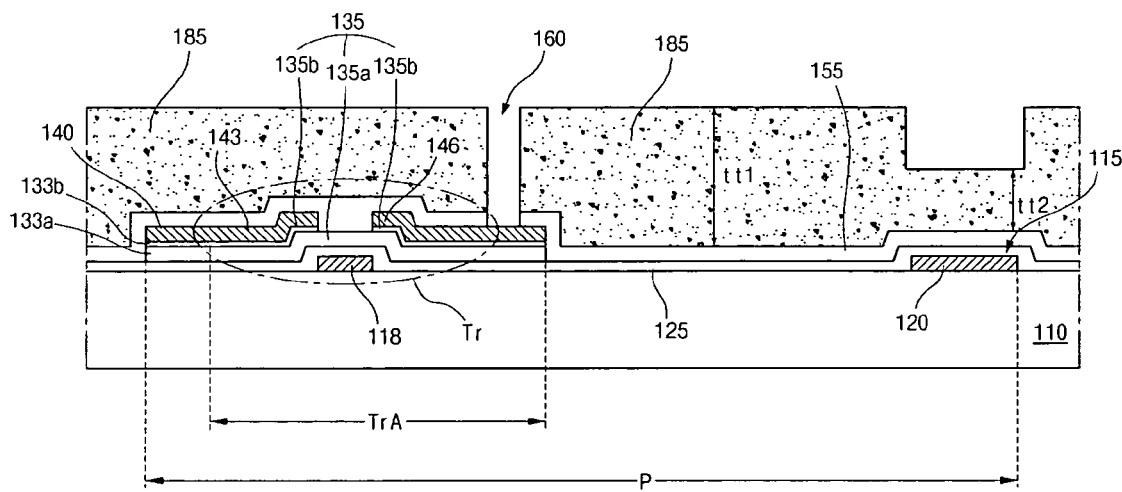

In FIG. 6F, the photoresist layer 183 is patterned into a second photoresist pattern 185 to a pre-drain contact hole (not shown) that exposes a portion of the insulating layer 153 over the drain electrode 146. The second photoresist pattern 185 has a first thickness "tt1" and a second thickness "tt2" thinner than the first thickness "tt1." The second thickness "tt2" of the second photoresist pattern 185 corresponds to the first storage electrode 120.

The insulating layer 153 is patterned into a passivation layer 155 that has a drain contact hole 160 that exposes a portion of the drain electrode 146.

Figure 6G:
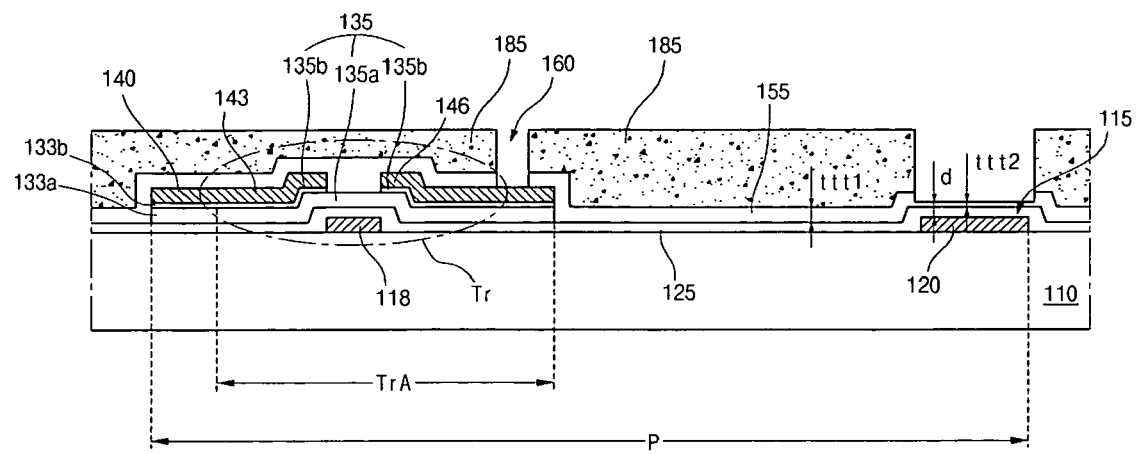

In FIG. 6G, the second photoresist pattern 185 is etched by the second thickness "tt2" to expose a portion of the passivation layer 155 over the first storage electrode 120.

Then, the passivation layer 155 over the first storage electrode 120 is etched to reduce a thickness of the passivation layer 155 over the first storage electrode 120.

In this step, the portion of the drain electrode 146 in the drain contact hole 160 is an etching stopper. Accordingly, the passivation layer 155 may have two different thicknesses. The passivation layer 155 may have a first thickness "ttt1" and a second thickness "ttt2" thinner than the first thickness "ttt1." The passivation layer 155 has the second thickness "ttt2" over the first storage electrode 120. The passivation layer 155 may have an open portion (not shown) that exposes a portion of the gate insulating layer 125 over the first storage electrode 120.

The passivation layer 155 may include gate pad contact hole (not shown) and data pad contact hole (not shown) that expose portions of the gate pad and data pad, respectively.

Figure 6H:
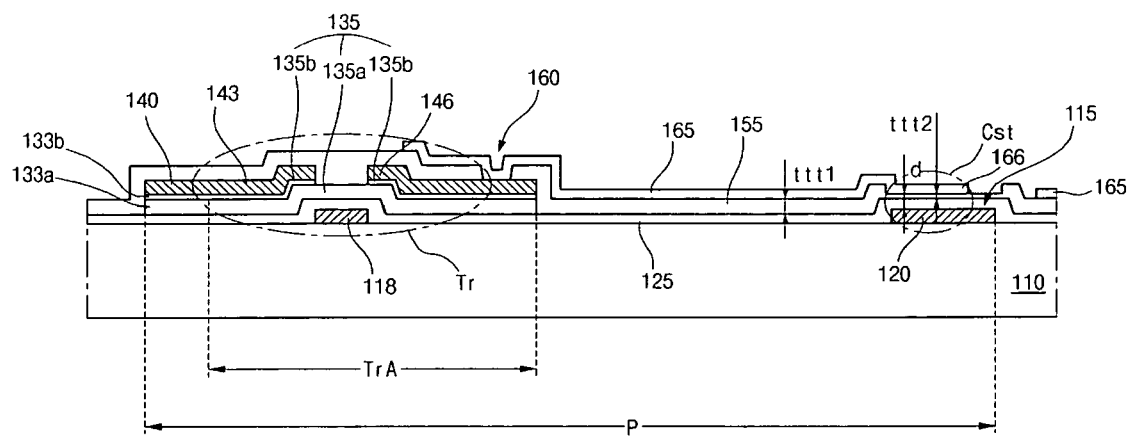

In FIG. 6H, a pixel electrode 165 and a second storage electrode 166 extended from the pixel electrode 165 may be formed by depositing a transparent conductive material such as indium tin oxide (ITO) or indium zinc oxide (IZO) on the passivation layer 155.

The pixel electrode 165 is connected to the drain electrode 146 via the drain contact hole 160 and the second storage electrode 166 overlaps with the first storage electrode 120.

The first and second storage electrodes 120 and 166, with the gate insulating layer 125 and the passivation layer 155 therebetween, are a dielectric configuration that constitutes a storage capacitor "Cst."

The second thickness "ttt2" of the passivation layer 155 corresponding to the storage capacitor "Cst" is thinner than the first thickness "ttt1."

A gate pad terminal (not shown) and a data pad terminal (not shown) may be subsequently formed by another process to connect the gate pad and the data pad via the gate pad contact hole and the data pad contact hole, respectively.

Accordingly, the array substrate for the LCD device of the present invention includes a storage capacitor having a dielectric with a thinner thickness in one area than a thickness in other areas. This enables the capacitance of the storage capacitor of the present invention to be increased.

Although the size of the storage capacitor of the present invention is smaller than the storage capacitor of the related art, the capacitance of the storage capacitor of the present invention may be increased without reducing an aperture ratio of the LCD device. Consequently, the aperture ratio and the brightness of the LCD device may be improved, even if the width of the gate line is reduced.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
    a gate line and a first storage electrode on a substrate, wherein the first storage electrode occupies a portion of the gate line;
    a gate insulating layer on the gate line and the first storage electrode;
    a data line over the gate insulating layer, the data line crossing the gate line to define a pixel region;
    a thin film transistor having a gate electrode connected to the gate line, a semiconductor layer over the gate electrode, a source electrode connected to the data line, and a drain electrode spaced apart from the source electrode;
    a passivation layer on the data line, wherein a first thickness of the passivation layer plus the gate insulating layer over the first storage electrode is thinner than a second thickness of the passivation layer plus the gate insulating layer over the gate electrode; and
    a pixel electrode and a second storage electrode on the passivation layer, the second storage electrode extended from the pixel electrode and overlapped with the first storage electrode.

2. The array substrate according to claim 1, wherein the passivation layer has a drain contact hole that exposes a portion of the drain electrode.

3. The array substrate according to claim 2, wherein the pixel electrode is connected to the drain electrode via the drain contact hole.

4. The array substrate according to claim 1, wherein the passivation layer has an open portion that exposes the gate insulating layer overlapping the gate line.

5. An array substrate for a liquid crystal display device, comprising:

a gate line on a substrate;

a data line crossing the gate line;

a thin film transistor connected to the gate line and the data line;

a pixel electrode connected to the thin film transistor, the pixel electrode overlapping the gate line in an overlapped region; and an insulating layer consisting of inorganic material between the gate line and the pixel electrode, wherein a first uniform thickness of the insulating layer corresponding to the overlapped region is thinner than a second thickness of the insulating layer corresponding to regions other than the overlapped region, and wherein in the overlapped region, the gate line, the insulating layer and the pixel electrode form a storage capacitor and wherein the storage capacitor includes a first storage electrode occupying a portion of the gate line and a second storage electrode extended from the pixel electrode.

6. The array substrate according to claim 5, wherein the thin film transistor includes a gate electrode connected to the gate line, a semiconductor layer over the gate electrode, a source electrode connected to the data line, and a drain electrode spaced apart from the source electrode.

7. The array substrate according to claim 6, wherein the insulating layer includes a gate insulating layer between the gate line and the data line and a passivation layer between the thin film transistor and the pixel electrode.

8. The array substrate according to claim 7, wherein the passivation layer has a drain contact hole that exposes a portion of the drain electrode.

9. The array substrate according to claim 8, wherein the pixel electrode is connected to the drain electrode via the drain contact hole.

* * * * *